(12) United States Patent
King et al.

(10) Patent No.: US 10,156,157 B2
(45) Date of Patent: Dec. 18, 2018

(54) S-SHAPED TRIP STRIPS IN INTERNALLY COOLED COMPONENTS

(71) Applicant: United Technologies Corporation, Hartford, CT (US)

(72) Inventors: Christopher King, Bristol, CT (US); Edward F. Pietraszkiewicz, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 415 days.

(21) Appl. No.: 14/622,062

(22) Filed: Feb. 13, 2015

(65) Prior Publication Data

US 2016/0237849 A1    Aug. 18, 2016

(51) Int. Cl.
| | |
|---|---|
| *F01D 5/18* | (2006.01) |
| *F01D 5/12* | (2006.01) |
| *F02C 7/24* | (2006.01) |
| *F02C 7/18* | (2006.01) |
| *F01D 25/12* | (2006.01) |
| *F01D 9/04* | (2006.01) |

(52) U.S. Cl.
CPC .............. *F01D 25/12* (2013.01); *F01D 5/18* (2013.01); *F01D 5/187* (2013.01); *F01D 9/04* (2013.01); *F02C 7/18* (2013.01); *F02C 7/24* (2013.01); *F01D 5/12* (2013.01); *F05D 2220/32* (2013.01); *F05D 2240/12* (2013.01); *F05D 2240/30* (2013.01); *F05D 2240/35* (2013.01); *F05D 2240/81* (2013.01); *F05D 2250/184* (2013.01); *F05D 2260/221* (2013.01); *Y02T 50/676* (2013.01)

(58) Field of Classification Search
CPC ... F01D 5/12; F01D 5/18; F01D 5/187; F01D 9/04; F02C 7/18; F02C 7/24; Y02T 50/60
See application file for complete search history.

(56) References Cited

U.S. PATENT DOCUMENTS

| | | | | |
|---|---|---|---|---|
| 2,640,194 | A * | 5/1953 | Larsson | F28F 3/042 138/38 |
| 4,034,587 | A * | 7/1977 | Schwarz | E04C 5/03 72/194 |
| 4,044,796 | A * | 8/1977 | Smick | F22B 37/06 122/155.2 |
| 4,336,838 | A * | 6/1982 | Ely | F28F 13/12 138/38 |
| 4,514,144 | A * | 4/1985 | Lee | B22C 9/04 416/96 R |
| 4,627,480 | A * | 12/1986 | Lee | B22C 9/04 164/122.1 |
| 4,775,296 | A * | 10/1988 | Schwarzmann | F01D 5/187 415/115 |

(Continued)

OTHER PUBLICATIONS

Extended European Search Report dated Jun. 30, 2016 in European Application No. 16154901.9.

*Primary Examiner* — Todd E Manahan
*Assistant Examiner* — Eric Linderman
(74) *Attorney, Agent, or Firm* — Snell & Wilmer L.L.P.

(57) ABSTRACT

A component for a gas turbine engine is provided. The component includes an internal cooling passage disposed within the component, and an s-shaped trip strip formed on a surface of the internal cooling passage.

17 Claims, 4 Drawing Sheets

(56) References Cited

U.S. PATENT DOCUMENTS

| | | | | |
|---|---|---|---|---|
| 4,786,233 A * | 11/1988 | Shizuya | F01D 5/187 | 416/90 R |
| 4,820,122 A * | 4/1989 | Hall | F01D 5/187 | 416/92 |
| 5,002,460 A * | 3/1991 | Lee | F01D 5/188 | 415/115 |
| 5,052,889 A * | 10/1991 | Abdel-Messeh | F01D 5/187 | 165/170 |
| 5,232,343 A * | 8/1993 | Butts | F01D 5/187 | 415/115 |
| 5,395,212 A * | 3/1995 | Anzai | F01D 5/187 | 415/115 |
| 5,468,125 A * | 11/1995 | Okpara | F01D 5/187 | 415/115 |
| 5,472,316 A * | 12/1995 | Taslim | F01D 5/187 | 416/96 R |
| 5,536,143 A * | 7/1996 | Jacala | F01D 5/187 | 416/96 R |
| 5,538,394 A * | 7/1996 | Inomata | F01D 5/187 | 415/115 |
| 5,611,662 A * | 3/1997 | Cunha | F01D 5/187 | 415/115 |
| 5,681,144 A * | 10/1997 | Spring | F01D 5/187 | 415/115 |
| 5,695,321 A * | 12/1997 | Kercher | F01D 5/187 | 415/115 |
| 5,704,763 A * | 1/1998 | Lee | F01D 5/188 | 415/115 |
| 5,738,493 A * | 4/1998 | Lee | F01D 5/187 | 415/115 |
| 5,797,726 A * | 8/1998 | Lee | F01D 5/187 | 416/96 R |
| 5,842,829 A * | 12/1998 | Cunha | F01D 5/186 | 415/115 |
| 5,924,843 A * | 7/1999 | Staub | F01D 5/187 | 415/115 |
| 5,967,752 A * | 10/1999 | Lee | F01D 5/187 | 416/97 R |
| 5,971,708 A * | 10/1999 | Lee | F01D 5/187 | 416/97 R |
| 5,975,850 A * | 11/1999 | Abuaf | F01D 5/187 | 415/115 |
| 5,997,251 A * | 12/1999 | Lee | F01D 5/187 | 416/97 R |
| 6,063,342 A * | 5/2000 | Kato | B01D 53/8631 | 422/171 |
| 6,065,931 A * | 5/2000 | Suenaga | F01D 5/187 | 415/115 |
| 6,099,251 A * | 8/2000 | LaFleur | F01D 5/147 | 415/115 |
| 6,099,252 A * | 8/2000 | Manning | F01D 5/187 | 415/116 |
| 6,132,174 A * | 10/2000 | Staub | F01D 5/187 | 415/115 |
| 6,227,804 B1 * | 5/2001 | Koga | F01D 5/187 | 415/115 |
| 6,247,896 B1 * | 6/2001 | Auxier | F01D 5/18 | 416/97 R |
| 6,331,098 B1 * | 12/2001 | Lee | F01D 5/187 | 416/97 R |
| 6,431,832 B1 * | 8/2002 | Glezer | F01D 5/187 | 416/97 R |
| 6,461,379 B1 * | 10/2002 | Carson | A61F 7/02 | 607/104 |
| 6,533,547 B2 * | 3/2003 | Anding | F01D 5/188 | 416/241 R |
| 6,554,571 B1 * | 4/2003 | Lee | F01D 5/187 | 416/92 |
| 6,666,262 B1 * | 12/2003 | Parneix | F28F 1/40 | 165/109.1 |
| 7,055,586 B2 * | 6/2006 | Sakakibara | F28D 7/1684 | 138/38 |
| 7,520,725 B1 * | 4/2009 | Liang | F01D 5/186 | 416/97 R |
| 7,637,720 B1 * | 12/2009 | Liang | F01D 5/187 | 416/96 R |
| 7,717,675 B1 * | 5/2010 | Liang | F01D 5/187 | 415/115 |
| 7,753,650 B1 * | 7/2010 | Liang | F01D 5/187 | 416/97 R |
| 7,775,769 B1 * | 8/2010 | Liang | F01D 5/187 | 415/115 |
| 7,985,049 B1 * | 7/2011 | Liang | F01D 5/186 | 416/97 R |
| 8,317,474 B1 * | 11/2012 | Liang | F01D 5/186 | 415/115 |
| 8,790,083 B1 * | 7/2014 | Liang | F01D 5/186 | 416/97 R |
| 8,840,363 B2 * | 9/2014 | Lee | F01D 5/186 | 415/115 |
| 8,864,438 B1 * | 10/2014 | Lee | F01D 5/188 | 415/1 |
| 8,936,067 B2 * | 1/2015 | Lee | B22C 9/10 | 164/369 |
| 8,974,183 B2 * | 3/2015 | Gleiner | F01D 5/187 | 416/97 R |
| 9,388,700 B2 * | 7/2016 | Propheter-Hinckley | | F01D 5/187 |
| 9,726,024 B2 * | 8/2017 | Buhler | F01D 9/02 | |
| 9,850,763 B2 * | 12/2017 | Itzel | F01D 5/188 | |
| 2001/0018024 A1 * | 8/2001 | Hyde | F01D 5/187 | 416/96 R |
| 2002/0028140 A1 * | 3/2002 | Jacala | F01D 5/187 | 416/96 R |
| 2002/0124404 A1 * | 9/2002 | Morihira | B21D 13/00 | 29/890.03 |
| 2003/0108422 A1 * | 6/2003 | Merry | F01D 5/187 | 416/97 R |
| 2003/0133795 A1 * | 7/2003 | Manning | F01D 5/187 | 416/97 R |
| 2004/0219017 A1 * | 11/2004 | Liang | F01D 5/187 | 416/97 R |
| 2005/0111976 A1 * | 5/2005 | Lee | F01D 5/081 | 416/97 R |
| 2005/0129508 A1 * | 6/2005 | Fried | F01D 5/187 | 415/115 |
| 2005/0163617 A1 * | 7/2005 | Weisse | B23P 15/04 | 416/232 |
| 2005/0244699 A1 * | 11/2005 | Shimoi | H01M 8/0247 | 429/514 |
| 2005/0281673 A1 * | 12/2005 | Draper | B23P 15/02 | 416/97 R |
| 2006/0051208 A1 * | 3/2006 | Lee | F01D 5/187 | 416/97 R |
| 2006/0056970 A1 * | 3/2006 | Jacala | F01D 5/08 | 416/97 R |
| 2006/0153679 A1 * | 7/2006 | Liang | F01D 5/081 | 416/97 R |
| 2006/0239820 A1 * | 10/2006 | Kizuka | F01D 5/187 | 416/97 R |
| 2006/0272794 A1 * | 12/2006 | Wobker | B22D 11/055 | 164/443 |
| 2006/0283980 A1 * | 12/2006 | Wang | B01F 5/0646 | 239/432 |
| 2007/0036652 A1 * | 2/2007 | Weisse | B23P 15/04 | 416/97 R |
| 2007/0128028 A1 * | 6/2007 | Liang | F01D 5/187 | 416/97 R |
| 2007/0128034 A1 * | 6/2007 | Lee | F01D 5/187 | 416/97 R |
| 2007/0128042 A1 * | 6/2007 | Weisse | B23P 15/04 | 416/233 |
| 2007/0224048 A1 * | 9/2007 | Abdel-Messeh | F01D 5/187 | 416/97 R |
| 2008/0050241 A1 * | 2/2008 | Liang | F01D 5/186 | 416/97 R |
| 2008/0050242 A1 * | 2/2008 | Liang | F01D 5/187 | 416/97 R |

(56) References Cited

U.S. PATENT DOCUMENTS

| | | | |
|---|---|---|---|
| 2008/0118366 A1* | 5/2008 | Correia | F01D 5/187 416/97 R |
| 2009/0041587 A1* | 2/2009 | Konter | F01D 5/187 416/97 R |
| 2009/0047136 A1* | 2/2009 | Chon | F01D 5/187 416/97 R |
| 2009/0074575 A1* | 3/2009 | Propheter-Hinckley | F01D 5/186 416/95 |
| 2009/0104042 A1* | 4/2009 | Liang | F01D 5/186 416/97 R |
| 2009/0180895 A1* | 7/2009 | Brittingham | F01D 5/187 416/97 R |
| 2009/0183850 A1* | 7/2009 | Morrison | B22F 5/009 164/91 |
| 2009/0183857 A1* | 7/2009 | Pierce | F28F 1/405 165/109.1 |
| 2009/0282804 A1* | 11/2009 | Smalley | F02C 7/10 60/39.511 |
| 2009/0317234 A1* | 12/2009 | Zausner | F01D 5/187 415/115 |
| 2010/0181055 A1* | 7/2010 | Yamada | F28D 9/005 165/167 |
| 2010/0183428 A1* | 7/2010 | Liang | F01D 5/187 415/115 |
| 2010/0193169 A1* | 8/2010 | Yamada | F28D 9/005 165/167 |
| 2010/0226788 A1* | 9/2010 | Liang | F01D 5/187 416/97 R |
| 2010/0247284 A1* | 9/2010 | Gregg | F01D 5/189 415/1 |
| 2011/0016717 A1* | 1/2011 | Morrison | B22F 3/105 29/889.72 |
| 2011/0033312 A1* | 2/2011 | Lee | F01D 5/187 416/97 R |
| 2012/0234018 A1* | 9/2012 | Cihlar | F01D 9/023 60/796 |
| 2012/0328450 A1* | 12/2012 | Spangler | F01D 5/187 416/97 R |
| 2013/0045111 A1* | 2/2013 | Lee | F01D 5/087 416/97 R |
| 2013/0052037 A1* | 2/2013 | Abdel-Messeh | F01D 5/186 416/97 R |
| 2013/0108416 A1* | 5/2013 | Piggush | F01D 5/187 415/173.1 |
| 2014/0056717 A1* | 2/2014 | Nadeau | F01D 5/186 416/97 R |
| 2014/0056719 A1* | 2/2014 | Morisaki | F01D 5/186 416/97 R |
| 2014/0086756 A1* | 3/2014 | Papple | F01D 5/081 416/90 R |
| 2014/0112799 A1* | 4/2014 | Lee | F01D 5/187 416/97 R |
| 2015/0003975 A1* | 1/2015 | Shchukin | F01D 5/18 415/178 |
| 2015/0159489 A1* | 6/2015 | Lee | F01D 5/189 416/97 R |
| 2015/0275676 A1* | 10/2015 | Liang | F01D 5/187 416/95 |
| 2015/0377029 A1* | 12/2015 | Blake | F01D 5/187 416/232 |
| 2016/0003053 A1* | 1/2016 | Propheter-Hinckley | F01D 5/187 60/752 |
| 2016/0069194 A1* | 3/2016 | Bommisetty | F01D 5/188 416/96 R |
| 2016/0362986 A1* | 12/2016 | Liang | F01D 5/187 |
| 2017/0002661 A1* | 1/2017 | Opderbecke | F01D 5/147 |
| 2017/0030202 A1* | 2/2017 | Itzel | F01D 5/188 |
| 2017/0138204 A1* | 5/2017 | Jimbo | F01D 5/187 |
| 2017/0159454 A1* | 6/2017 | Spangler | F01D 5/188 |
| 2017/0159455 A1* | 6/2017 | Spangler | F01D 5/189 |
| 2017/0159456 A1* | 6/2017 | Spangler | F01D 5/189 |
| 2017/0248025 A1* | 8/2017 | Martin, Jr. | F01D 5/188 |
| 2018/0023403 A1* | 1/2018 | Jones | F01D 9/02 |
| 2018/0135432 A1* | 5/2018 | Martin, Jr. | F01D 5/189 |

* cited by examiner

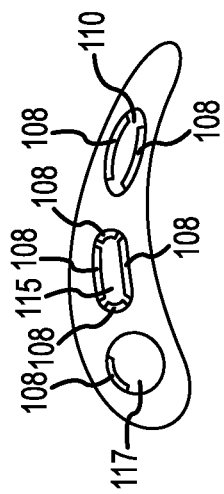
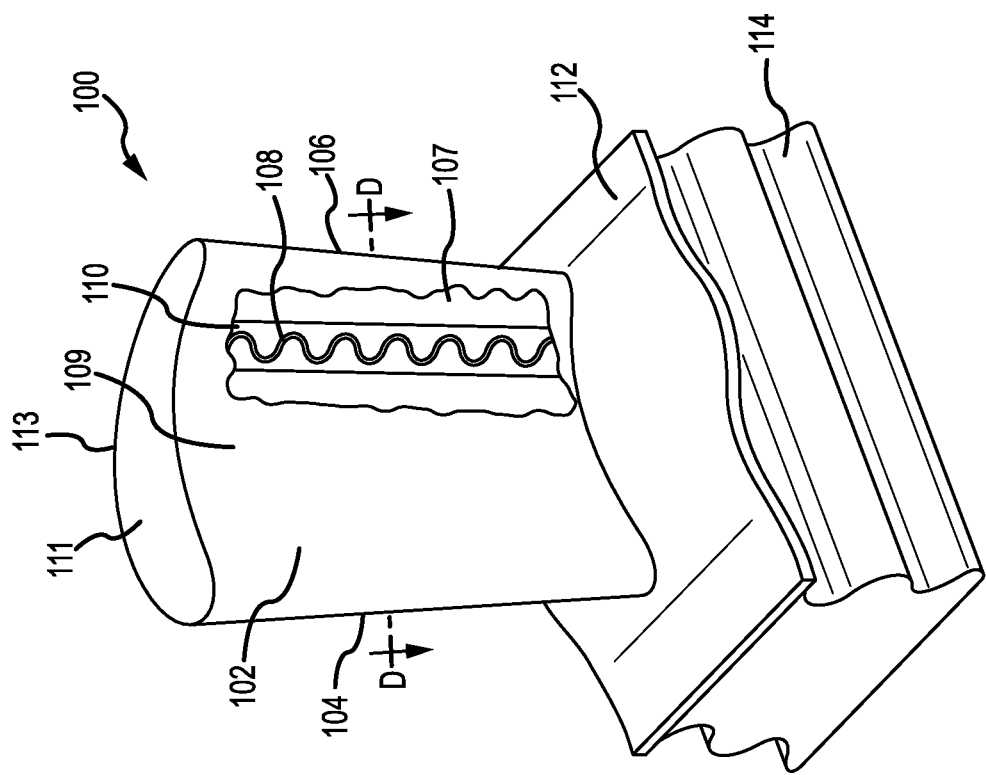

US 10,156,157 B2

S-SHAPED TRIP STRIPS IN INTERNALLY COOLED COMPONENTS

FIELD OF INVENTION

The present disclosure relates to gas turbine engines, and, more specifically, to an internally cooled component with s-shaped trip strips.

BACKGROUND

Turbine airfoils or outer air seals operate in an environment where the gas temperatures often exceed the thermal capacity of materials in the engine. These parts may rely on cooling features to protect against damage. Cooling air from the compressor can be routed to provide internal convection cooling within the airfoils. However, more cooling air bled from the compressor and used for cooling means less gas is available for work extraction. Thus, engine efficiency may be reduced if higher amounts of cooling air are consumed. As demands increase for higher thrust and/or efficiency, the turbine inlet temperatures are increased while the gas allocated for cooling is reduced.

Some components may implement air cooling systems with a series of internal cavities to cool a part. In some instances, the air recirculates in an uncontrolled pattern before being bled off into another region of the part. The erratic air recirculation patterns may limit the efficacy of internal flow cooling systems.

SUMMARY

A component for a gas turbine engine includes an internal cooling passage disposed within the component. An s-shaped trip strip may be formed on a surface of the internal cooling passage.

In various embodiments, a linear trip strip may be formed on the surface of the internal cooling passage extending in an aft direction away from the s-shaped trip strip. A second linear trip strip may be formed on the surface of the internal cooling passage and extend in a forward direction away from the s-shaped trip strip. The s-shaped trip strip may be off-center relative to the surface of the internal cooling passage. The s-shaped trip strip may be continuous. The s-shaped trip strip may also be broken. A second internal cooling passage may be in fluid communication with the s-shaped trip strip.

A gas turbine engine may comprise a compressor, an internally cooled component may be disposed aft of the compressor and include a cooling passage. A serpentine trip strip may be disposed on a surface of the cooling passage. The compressor may be configured to deliver coolant to the cooling passage. A linear trip strip may be formed on the surface of the cooling passage and may extend in an aft direction away from the serpentine trip strip. A second linear trip strip may be formed on the surface of the cooling passage and extend in a forward direction away from the serpentine trip strip. The serpentine trip strip may be off-center relative to the surface of the cooling passage. The serpentine trip strip may be continuous. The serpentine trip strip may also be broken. A second internal cooling passage may be in fluid communication with the serpentine trip strip. The internally cooled component may comprise an airfoil.

An internally cooled component may comprise an internal cooling passage and an s-shaped trip strip formed on a surface of the internal cooling passage.

In various embodiments, A linear trip strip may be formed on the surface of the internal cooling passage and extend away from the s-shaped trip strip. A second linear trip strip may be formed on the surface of the internal cooling passage and extend away from the s-shaped trip strip and the linear trip strip. The s-shaped trip strip may be off-center relative to the surface of the internal cooling passage.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 2A illustrates a perspective view of an airfoil having an internal cavity with s-shaped trip strips, in accordance with various embodiments;

FIG. 2B illustrates a cross-sectional view of an airfoil having an internal cavity with s-shaped trip strips, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
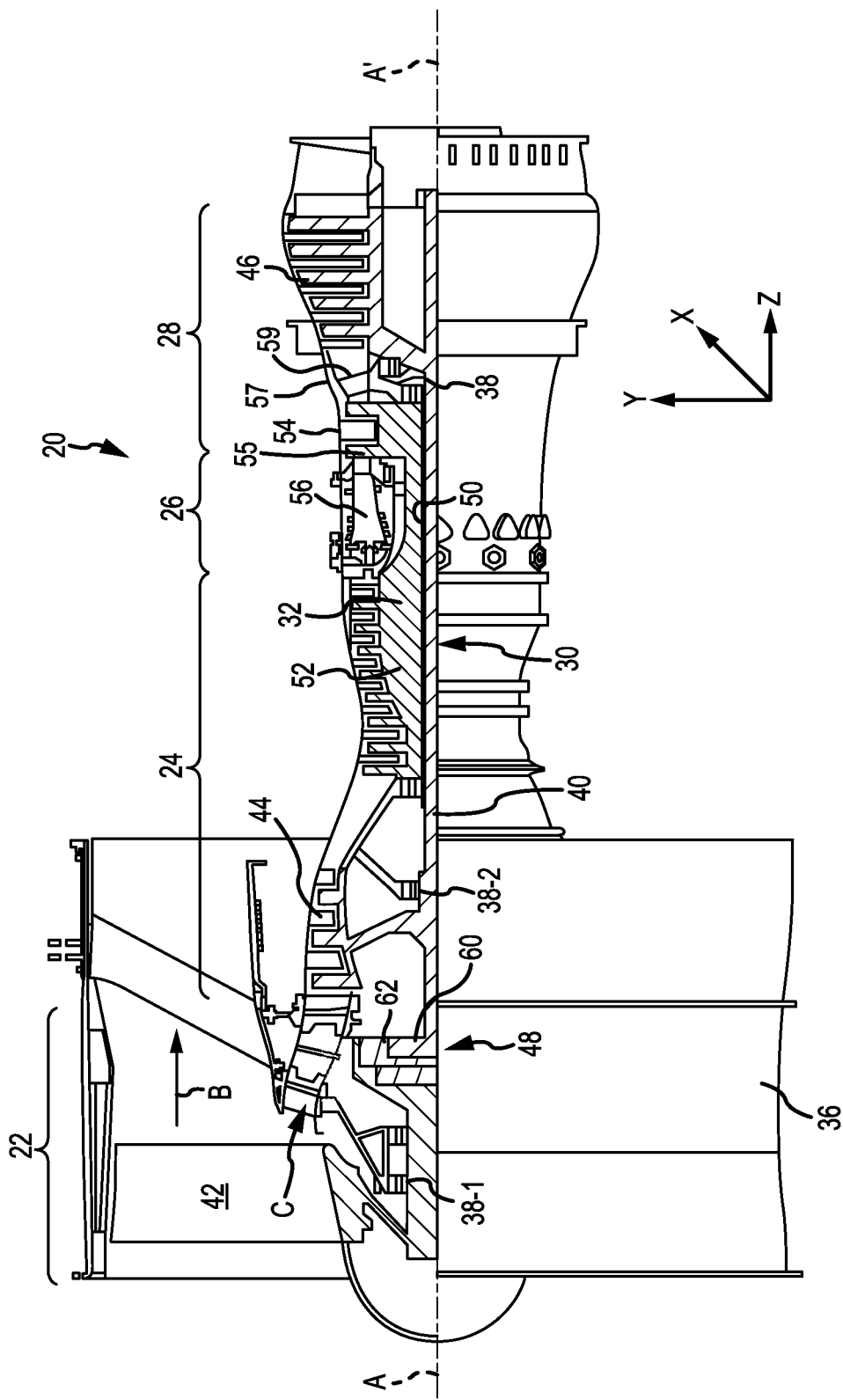
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 55 of high-pressure turbine may rotate about the engine central longitudinal axis A-A'.

A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Airfoil 55 may be an internally cooled component of gas turbine engine 20. Trip strips may be located in internal cooling cavities of internally cooled engine parts, as detailed further below. Internally cooled engine parts may be discussed in the present disclosure in terms of airfoils. However, the present disclosure applies to any internally cooled engine component (e.g., blade outer air seals, airfoil platforms, combustor liners, blades, vanes, or any other internally cooled component in a gas turbine engine).

With reference to FIG. 2A, an airfoil 100 is shown with s-shaped trip strips 108 (also referred to herein as serpentine trip strips 108) in internal cavities, in accordance with various embodiments. Although an airfoil is shown, the present disclosure applies to any internally cooled part (e.g., blade outer air seals, airfoil platforms, combustor components, etc.). S-shaped trip strip 108 may be a protrusion from an internal cooling cavity. S-shaped trip strip 108 is illustrated with as a continuous ridge in cooling passage 110 having a serpentine pattern. In various embodiments, s-shaped trip strip 108 may also have a discontinuous or broken ridge in cooling passage 110. Airfoil 100 has a pressure side 102, a leading edge 104, and a trailing edge 106. Airfoil 100 also includes top 111 and suction side 113. Pressure side 102 surface is cutaway to illustrate s-shaped trip strip 108 on an internal surface of cooling passage 110. Material 107 may define internal passages such as cooling passage 110. Cooling passage 110 is oriented generally in a direction from platform 112 and attachment 114 towards top 111 (i.e., a radial direction when airfoil 100 is installed in a turbine).

In various embodiments, s-shaped trip strip 108 may extend generally in the direction from platform 112 towards top 111 while oscillating in a serpentine pattern towards and away from leading edge 104 and trailing edge 106. In that regard, s-shaped trip strip 108 may have a contour with smooth, repetitive oscillations similar to a sine wave. Airfoil 100 may contain multiple cooling passages or chambers similar to cooling passage 110, as further illustrated in FIG. 2B, with the internal cooling passages being interconnected. Multiple trip strips may appear in the internal cooling passages, as illustrated in further detail below. Hot air flowing through a gas turbine engine may first contact leading edge 104, flow along pressure side 109 and/or suction side 113, and leave airfoil at trailing edge 106.

With further reference to FIG. 2B, a cross sectional view along line D-D is shown, in accordance with various embodiments. Cooling passage 110 includes s-shaped trip strips 108 on opposing internal surfaces. Cooling passage 115 has s-shaped trip strips 108 disposed about the internal surfaces of cooling passage 115. Cooling passage 117 includes s-shaped trip strips 108 on one internal surface. S-shaped trip strips 108 may be disposed on any internal surface in a cooling passage. Similarly, any number of trip strips may be deployed as a turbulator for air flow and provide increased surface area for heat transfer. In that regard, s-shaped trip strips 108 tend to increase heat transfer between coolant (i.e., air from the compressor section) and the walls of internal cooling passages. Thus, cooling efficiency may be improved.

In various embodiments, s-shaped trip strips 108 in cooling passage 110 may be made using an additive manufacturing technique such as direct metal laser sintering, selective laser sintering, selective laser melting, electron-beam melting, or electron-beam freeform fabrication. Casting may also be used to form s-shaped trip strips in an internally cooled component. To cast an airfoil 100 or another internally cooled component with a cooling passage 110 and s-shaped trip strips 108, a core may be formed. The core of the component wall may have a negative of the s-shaped trip strips. In that regard, s-shaped trip strips may be formed as indentations on a core. The core may then be placed in a mold, and the material to form the internally cooled component may be deposited in the mold. The core may layer be removed from the internally cooled component, leaving a cavity with the desired s-shaped trip strips. Airfoil 100 (as well as other internally cooled components) may be made from an austenitic nickel-chromium-based alloy such as that sold under the trademark Inconel® which is available from Special Metals Corporation of New Hartford, N.Y., USA, or other materials capable of withstanding exhaust temperatures.

Figure 3C:
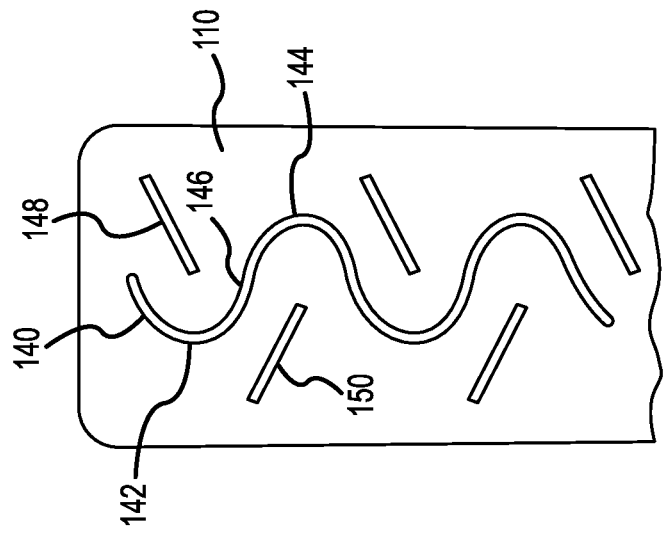
FIG. 3C illustrates a wall of an internal cavity having a central s-shaped trip strip supplemented with linear trip strips on both sides, in accordance with various embodiments.
Figure 3B:
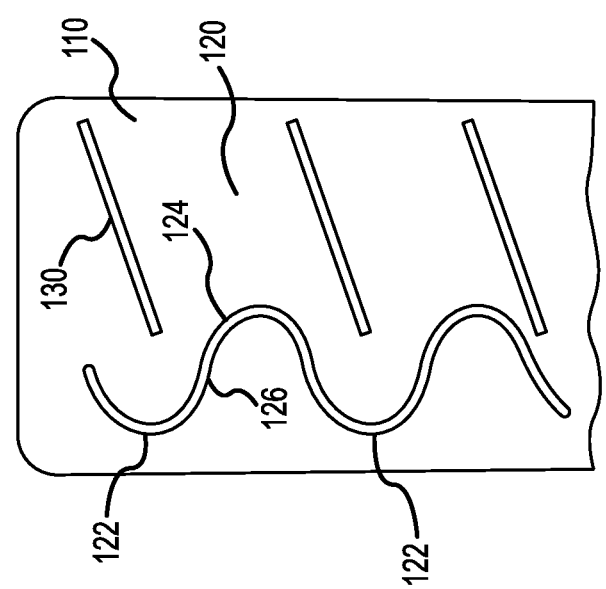
FIG. 3B illustrates a wall of an internal cavity having an off centered s-shaped trip strip supplemented with linear trip strips on one side, in accordance with various embodiments.
Figure 3A:
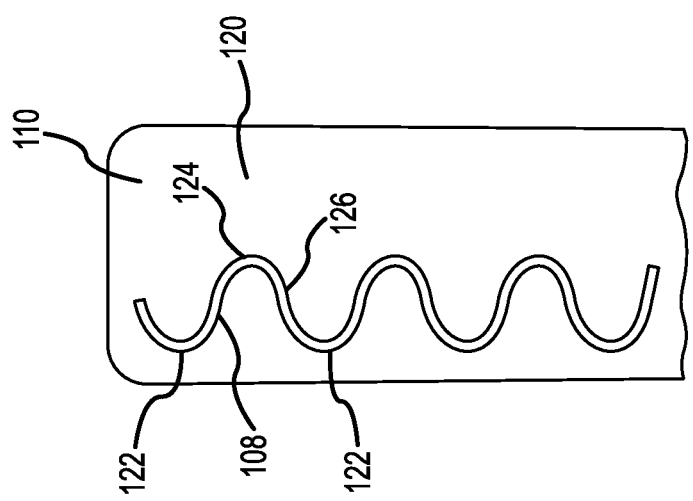
FIG. 3A illustrates a wall of an internal cavity having an off-centered, s-shaped trip strip is shown, in accordance with various embodiments.

In various embodiments, FIGS. 3A-3C illustrate potential trip strip configurations that may be formed on a ceramic core or on an internally cooled device. When formed on a ceramic core, the trip strip configurations may be indentations in the core. When formed on an internally cooled part (e.g., airfoil 100 of FIG. 2A), the trip strip configurations may protrude from an internal passage.

With reference to FIG. 3A, a wall of cooling passage 110 having s-shaped trip strip 108 in an off-centered configuration on internal surface 120 is shown. S-shaped trip strip 108 formed on internal surface 120 includes peaks 122 and troughs 124 in a wave-like shape. Peaks 122 and troughs 124 may be connected by middle segments 126. Middle segments 126 may be continuous or broken. Similarly, peaks 122 and/or troughs 124 may be continuous or broken. Middle segments 126 may have uniform length or varied length at various points along s-shaped trip strip 108. The relative angle of consecutive middle segments 126 may be between 0 degrees (i.e., parallel) and 15 degrees. Peaks 122 and troughs 124 may have various arc lengths and various shapes. For example, peaks 122 and troughs 124 may be semi-circular, semi-elliptical, semi-squared, or v-shaped. The height of s-shaped trip strips 108 from internal surface 120 (i.e., out of the page as depicted) may be constant or varied throughout s-shaped trip strip 108. S-shaped trip strip 108 may act as a turbulator for coolant in cooling passage 110 and provide surface area to facilitate heat transfer.

FIG. 3B illustrates a wall of an internal cavity having an off centered s-shaped trip strip similar to s-shaped trip strip of FIG. 3A, in accordance with various embodiments. S-shaped trip strip 108 may be supplemented with linear trip strips on one side. Linear trip strips 130 are formed proximate s-shaped trip strip 108. A linear trip strip 130 may extend from an area defined by a peak 122 and middle segments 126 adjacent the peak. The linear trip strips 130 may be substantially similar to one another and have a fixed position relative to the nearest peak 122. The height of linear trip strips 130 from internal surface 120 (i.e., height referring to the direction out of the page as depicted) may be constant or varied throughout s-shaped trip strip 108. Linear trip strip 130 may also be continuous or broken. Linear trip strip 130 may extend in a forward or aft direction (towards leading edge 104 or trailing edge 106 as depicted in FIG. 2A) away from s-shaped trip strip 108. Linear trip strips 130 may further turbulate flowing in coolant in cooling passage 110 and provide additional surface area to facilitate heat transfer. In that regard, each peak 122, trough 124, and middle segment 126 may be in fluid communication with the other sections of s-shaped trip strip 108.

With reference to FIG. 3C, a wall of cooling passage 110 is shown having s-shaped trip strip 140 in a central configuration but otherwise similar to s-shaped trip strip 108 of FIG. 3A. S-shaped trip strip 140 may be supplemented with linear trip strips 148 and 150. Linear trip strips 148 may extend from an area of cooling passage 110 proximate a peak 142 between adjacent middle segments 146. Similarly, linear trip strips 150 may extend from an area of cooling passage 110 proximate a trough 144 between adjacent middle segments 146. Linear trip strips 148 and linear trip strips 150 may further turbulate coolant flowing in cooling passage 110 and provide additional surface area to facilitate heat transfer.

Figure 3D:
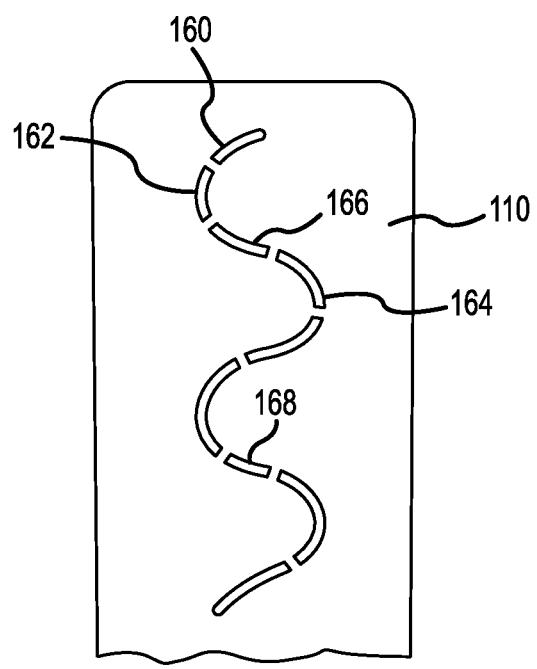
FIG. 3D illustrates a wall of an internal cavity having a discontinuous, s-shaped trip strip, in accordance with various embodiments.

With reference to FIG. 3D, a wall of cooling passage 110 is shown having s-shaped trip strip 160 in a central configuration similar to s-shaped trip strip 108 of FIG. 3A. S-shaped trip strip 160 may be composed of multiple segments 168. As a result, S-shaped trip strip 160 may have a discontinuous or broken form. Segments may extend from peak 162 to trough 164. Segments 168 may have uniform or non-uniform length. Segments 168 may also be limited to an individual peak 162, trough 164, and/or middle segment 166. In that regard, segments 168 may have various lengths and shapes to form s-shaped trip strip 160. S-shaped strip 160 with segments 168 may further turbulate coolant flowing in cooling passage 110 and provide additional surface area to facilitate heat transfer.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil for a gas turbine engine, comprising:
   an internal cooling passage disposed within the airfoil;
   an opposing set of s-shaped trip strips formed on opposing surfaces of the internal cooling passage and extending spanwise along at least 75% of an airfoil span as measured between an airfoil root and an airfoil tip of the airfoil;
   each of the opposing set of s-shaped trip strips comprising a peak, a trough, a first middle segment, and a second middle segment, wherein the peak and the trough defines a contour having smooth or repetitive oscillations, wherein each of the opposing set of s-shaped trip strips extend partially into the interior of the internal cooling passage from a respective surface of the internal cooling passage toward an opposing surface of the internal cooling passage and terminates prior to contacting the opposing surface of the internal cooling passage;
   and each of the opposing set of s-shaped trip strips further comprising a first linear trip strip formed on the respective surface of the internal cooling passage proximate an s-shaped trip strip, wherein the first linear trip strip extends in an aft direction from an area defined between the first middle segment and the second middle segment and proximate one of the peak or the trough.

2. The airfoil of claim 1, further comprising a second linear trip strip formed on the respective surface of the internal cooling passage and extending in a forward direction away from the s-shaped trip strip.

3. The component of claim 1, wherein the s-shaped trip strip is off-center relative to the respective surface of the internal cooling passage.

4. The airfoil of claim 1, wherein the s-shaped trip strip is continuous.

5. The component of claim 1, wherein the s-shaped trip strip is broken.

6. The airfoil of claim 1, further comprising a second internal cooling passage in fluid communication with the s-shaped trip strip.

7. A gas turbine engine, comprising:
   a compressor;
   an internally cooled airfoil aft of the compressor comprising a cooling passage;
   an opposing set of serpentine trip strips disposed on opposing surfaces of the cooling passage and extending spanwise along at least 75% of an airfoil span as measured between an airfoil root and an airfoil tip of the internally cooled airfoil;
   each of the opposing set of serpentine trip strips comprising a peak, a trough, a first middle segment, and a second middle segment, wherein the peak and the trough defines a contour having smooth or repetitive oscillations, wherein each of the opposing set of serpentine trip strips extends partially into the interior of the cooling passage from a respective surface of the cooling passage toward the opposing surface of the cooling passage and terminates prior to contacting the opposing surface of the cooling passage, and each of the opposing set of serpentine trip strips further comprising a first linear trip strip formed on the respective surface of the internal cooling passage proximate a serpentine trip strip, wherein the first linear trip strip extends in an aft direction from an area defined between the first middle segment and the second middle segment and proximate one of the peak or the trough.

8. The gas turbine engine of claim 7, wherein the compressor is configured to deliver coolant to the cooling passage.

9. The gas turbine engine of claim 7, further comprising a second linear trip strip formed on the respective surface of the cooling passage and extending in a forward direction away from the serpentine trip strip.

10. The gas turbine engine of claim 7, wherein the serpentine trip strip is off-center relative to the respective surface of the cooling passage.

11. The gas turbine engine of claim 7, wherein the serpentine trip strip is continuous.

12. The gas turbine engine of claim 7, wherein the serpentine trip strip is broken.

13. The gas turbine engine of claim 7, further comprising a second internal cooling passage in fluid communication with the serpentine trip strip.

14. The gas turbine engine of claim 7, wherein the internally cooled airfoil comprises an airfoil.

15. An internally cooled airfoil, comprising:
   an internal cooling passage; and
   an opposing set of s-shaped trip strips formed on opposing surfaces of the internal cooling passage and extending spanwise along at least 75% of an airfoil span as measured between an airfoil root and an airfoil tip of the internally cooled airfoil;
   each of the opposing set of s-shaped trip strips comprising a peak, a trough, a first middle segment, and a second middle segment, wherein the peak and the trough defines a contour having smooth or repetitive oscillations, wherein each of the opposing set of s-shaped trip strips extend partially into the interior of the internal cooling passage from a respective surface of the internal cooling passage toward an opposing surface of the internal cooling passage and terminates prior to contacting the opposing surface of the internal cooling passage, and each of the opposing set of s-shaped trip strips further comprising a first linear trip strip formed on the respective surface of the internal cooling passage proximate an s-shaped trip strip, wherein the first linear trip strip extends in an aft direction from an area defined between the first middle segment and the second middle segment and proximate one of the peak or the trough.

16. The internally cooled airfoil of claim 15, further comprising a second linear trip strip formed on the respective surface of the internal cooling passage and extending away from the s-shaped trip strip and the first linear trip strip.

17. The internally cooled component of claim 15, wherein the s-shaped trip strip is off-center relative to the respective surface of the internal cooling passage.

\* \* \* \* \*